United States Patent
Guo et al.

(10) Patent No.: US 11,555,087 B2
(45) Date of Patent: *Jan. 17, 2023

(54) PREPOLYMER OF ELASTOMER MATERIAL FOR SCREW DRILLING TOOL AND PREPARATION METHOD THEREOF

(71) Applicant: SHANGHAI PUJIA DRILLING TECHNOLOGY CO., LTD., Shanghai (CN)

(72) Inventors: Dingyu Guo, Calgary (CA); Hongrui Zhang, Tianjin (CN); Minghui Zhu, Shanghai (CN); Yiran Liu, Xuzhou (CN); Zhuanrui Liu, Xuzhou (CN); Paul Kwong Shun Cheung, Calgary (CA); Xiaobo Liu, Chengdu (CN)

(73) Assignee: SHANGHAI PUJIA DRILLING TECHNOLOGY CO., LTD., Shanghai (CN)

( * ) Notice: Subject to any disclaimer, the term of this patent is extended or adjusted under 35 U.S.C. 154(b) by 278 days.

This patent is subject to a terminal disclaimer.

(21) Appl. No.: 16/843,915

(22) Filed: Apr. 9, 2020

(65) Prior Publication Data

US 2020/0231734 A1 Jul. 23, 2020

Related U.S. Application Data

(63) Continuation of application No. PCT/CN2019/082762, filed on Apr. 15, 2019.

(30) Foreign Application Priority Data

Oct. 17, 2018 (CN) .......................... 201811211487.2

(51) Int. Cl.
| | |
|---|---|
| C08G 18/12 | (2006.01) |
| C08G 18/48 | (2006.01) |
| C08G 18/32 | (2006.01) |
| C08G 18/75 | (2006.01) |
| C08G 18/76 | (2006.01) |
| C08L 9/02 | (2006.01) |
| E21B 4/02 | (2006.01) |
| C08G 18/69 | (2006.01) |

(52) U.S. Cl.
CPC ......... *C08G 18/12* (2013.01); *C08G 18/3206* (2013.01); *C08G 18/3218* (2013.01); *C08G 18/48* (2013.01); *C08G 18/4808* (2013.01); *C08G 18/4812* (2013.01); *C08G 18/4833* (2013.01); *C08G 18/4854* (2013.01); *C08G 18/696* (2013.01); *C08G 18/753* (2013.01); *C08G 18/7621* (2013.01); *C08L 9/02* (2013.01); *E21B 4/02* (2013.01)

(58) Field of Classification Search
CPC ............ C08G 18/4808; C08G 18/4812; C08G 18/4833; C08G 18/4854; C08G 18/696; C08G 18/12

See application file for complete search history.

(56) References Cited

U.S. PATENT DOCUMENTS 6,734,274 B2 * 5/2004 Suzuki ................... C08G 18/12
399/361

FOREIGN PATENT DOCUMENTS

| | | | |
|---|---|---|---|
| CN | 101255327 A | | 9/2008 |
| CN | 105175683 A | * | 12/2015 |
| CN | 105176474 A | | 12/2015 |
| CN | 105367736 A | | 3/2016 |
| CN | 105622892 A | | 6/2016 |
| CN | 107652937 A | | 2/2018 |
| JP | 2008006042 A | * | 1/2008 |
| WO | 2008157571 A2 | | 12/2008 |

OTHER PUBLICATIONS

JP-2008006042_Jan. 2008_English Translation.*
CN-105175683_Dec. 2015_English Translation.*

* cited by examiner

*Primary Examiner* — Michael L Leonard
(74) *Attorney, Agent, or Firm* — Bayramoglu Law Offices LLC

(57) ABSTRACT

A prepolymer of elastomer material for screw drilling tools and a preparation method thereof are provided. The prepolymer includes component A and component B, wherein the component A includes hydroxyl-terminated liquid rubber, polytetrahydrofuran diol, and polyether polyol; the component B includes at least one of an isocyanate, a cyanate, and a cyano compound; the mass ratio of the hydroxyl-terminated liquid rubber, polytetrahydrofuran diol, and polyether polyol is (0.2-1.0): (0.2-1.0): (0.2-1.0). Different molecular segments of different proportions are introduced through structural design, such that the molecular structure of the prepolymer has both rigid and flexible segments, thus to achieve an adjustable and controllable structure of the prepolymer; and the introduction of active groups makes the prepolymer to show good reactivity and processability. Therefore, a reactive elastomer material having excellent properties such as hardness, tear strength, and tensile strength can be obtained used as an elastomer material for screw drilling tools.

14 Claims, No Drawings

PREPOLYMER OF ELASTOMER MATERIAL FOR SCREW DRILLING TOOL AND PREPARATION METHOD THEREOF

CROSS REFERENCE TO THE RELATED APPLICATIONS

This application is a continuation application of International Application No. PCT/CN2019/082762, filed on Apr. 15, 2019, which is based upon and claims priority to Chinese Patent Application No. 201811211487.2, filed on Oct. 17, 2018, the entire contents of which are incorporated hereby by reference.

TECHNICAL FIELD

The present invention relates to the field of organic polymers, and in particular, to a prepolymer of elastomer material for screw drilling tools and a preparation method thereof. The prepolymer of elastomer material may be applied in the field of drilling as the material for screw drilling tools.

BACKGROUND

With the increasing complexity of the drilling environment and the increasing difficulty of mining, the working conditions of drilling operations are becoming more and more severe, and the requirements for the comprehensive performance of elastomer materials for screw drilling tools are becoming higher and higher. At the same time, the tensile strength, tear strength, peel strength, wear resistance, hardness, and temperature resistance characteristics of the elastomer materials for screw drilling tools will directly affect the material's service life and drilling costs under specific conditions of use. Therefore, improving the comprehensive performance of materials through molecular design has become one of the research hotspots and important development directions of elastomer materials for screw drilling tools.

At present, most of the elastomer materials for traditional screw drilling tools are rubber materials, and they have relatively low-temperature resistance, which has limited the use of elastomer materials in drilling operations to a certain extent, and it is difficult to meet the requirements for the key development of high-temperature elastomer materials for screw drilling tools. At the same time, the tensile strength, tear strength and hardness of traditional rubber materials for screw drilling tools are also not excellent, the materials have a fast loss rate and a short service life, such that the economic benefit of drilling is greatly reduced, and the current technological requirements and development trends of cost-effective drilling operations cannot be met. Therefore, a new type of elastomer material for screw drilling tools came into being. This material not only inherits the advantages of wear resistance and corrosion resistance of traditional materials, but also has the properties such as high hardness, high-temperature resistance, high tear strength and high interfacial peel strength, such that the material's service life is improved, and the severe drilling operation environment can be better met. At the same time, the material can be processed by one-shot molding, which makes the production process of the stator of screw drilling tool simpler and helps to improve the benefits of exploration and development. Therefore, the development and research of new elastomer materials for screw drilling tools will be of great significance in the fields of scientific research and applications.

However, the current conventional elastomers have the following problems: (1) The hardness of conventional elastomers can generally reach about Shore 75A, not that the hardness of the rubber cannot be higher, but that there are some problems such as difficulty in injecting (cannot be injected) and inadequate adhesion between the colloid and the inner wall of stator tube (metal) or failure in adhesion when the stator of drilling tool is manufactured if the hardness of the rubber is higher; in addition, in the prior art, increasing the hardness of rubber mainly depends on the addition of fillers, although the hardness has been improved, the tear strength of the colloid is difficult to improve, sometimes even being lowered, and when realizing large torque, the drilling tool is easy to be crashed and damaged. (2) Conventional elastomers will gradually soften with the increase of application temperature, that is, the hardness is not maintained, and the drilling tools made with them have low power and soft mechanical characteristics, so the drilling tools have low dynamic performance. (3) Conventional polyurethane elastomers have poor water resistance, especially being not resistant to high-pressure steam, and cannot meet the application requirements of high-temperature drilling operations.

SUMMARY

In view of the defects in the prior art, an object of the present invention is to provide a prepolymer of elastomer material for screw drilling tools and a preparation method thereof. The purpose is to overcome the disadvantages of traditional elastomeric materials for screw drilling tools such as weak temperature resistance, low hardness, tear strength, and interfacial peel strength; provide a new technology for preparing elastomer materials for screw drilling tools; achieve an adjustable and controllable structure of the prepolymer of elastomer material; improve the processability and simplify the processing technology.

First, the elastomer material prepared by the prepolymer provided by the present invention is easy to increase the hardness and has good bonding processability with metal after the hardness is increased, which can easily ensure the adhesive strength between the colloid and the inner wall of a stator of drilling tool when manufacturing the stator. Second, in its application temperature range, the hardness is well maintained and it does not gradually soften with the increase of temperature, which is conducive to improving the dynamic performance of the drilling tool. Third, when the hardness is increased, the tear strength will also be greatly improved without the addition of fillers. When the drilling tool achieves high dynamic performance, the material can be better maintained without being crashed and loosed, thus to ensure the service life of the drilling tool.

The object of the present invention is achieved by the following technical solutions.

In a first aspect, the present invention provides a prepolymer of elastomer material for screw drilling tools, which includes component A and component B, wherein the component A includes hydroxyl-terminated liquid rubber, polytetrahydrofuran diol, and polyether polyol; the component B includes at least one of an isocyanate, a cyanate, and a cyano compound.

The mass ratio of the hydroxyl-terminated liquid rubber, polytetrahydrofuran diol, and polyether polyol is (0.2-1.0): (0.2-1.0): (0.2-1.0). The hydroxy-terminated liquid rubber is used to terminate and provide a crosslinking point, and the polytetrahydrofuran diol and polyether polyol are used to terminate. Adjusting the ratio of the three within this range is beneficial for controlling the viscosity of the prepolymer, the degree of crosslinking reaction, and the comprehensive properties of the final elastomer. Compounding ratios outside this range will cause the prepolymer viscosity to be too large or too small, or the final performance of the elastomer will not meet the application requirements.

Preferably, the hydroxyl-terminated liquid rubber includes hydroxyl-terminated liquid nitrile rubber (HTBN). The choice of hydroxyl-terminated liquid nitrile rubber can not only increase the water resistance of the elastomer, but also be used to terminate and increase the crosslinking point, thereby improving the crosslinking degree and final strength of the elastomer. If other hydroxyl-terminated liquid rubber is used, it is difficult to increase the crosslinking degree because it does not have reactive groups for co-crosslinking reactions, which affects the overall performance of the elastomer.

Preferably, the isocyanate includes at least one of toluene diisocyanate (TDI) and isophorone diisocyanate (IPDI). If other types of isocyanate are used, such as diphenylmethane diisocyanate, di-cyclohexyl methane diisocyanate, etc., the reaction rate will be too fast and the comprehensive performance of the reaction product will not meet the performance requirements of the present invention, which is not suitable for the present invention.

Preferably, the polyether polyol includes at least one of propylene glycol polyether with a weight average molecular weight of 800 to 2000, trimethylolpropane polyether with a weight average molecular weight of 400 to 4000, and polyethylene glycol with a weight average molecular weight of 400 to 2000. By adjusting the type and molecular weight of the polyether polyol, the viscosity of the prepolymer and the hardness and recovery of the final elastomer can be effectively controlled.

Preferably, the mass ratio of the component A and the component B is (0.9:1.1) to (0.85:1.25). When the ratio of the component A and the component B is within this range, the terminating reaction of the two components is relatively complete and the reaction degree is excellent, and the molecular structure of the final prepolymer is regular and controllable.

More preferably, the mass ratio of the component A and the component B is 1:1. When Component A:component B=1:1, the terminating reaction of the two components is the most complete and the reaction degree is the best, and the molecular structure of the final prepolymer is the most regular and controllable.

In a second aspect, the present invention provides a preparation method of a prepolymer of elastomer material for screw drilling tools, including the following steps:

S1. placing component B in a reaction vessel, raising the temperature, and performing dehydration under negative pressure;

S2. adding component A to the component B having been processed in step S1, performing polymerization reaction at a temperature of 50-95° C.; and cooling them to room temperature to obtain the prepolymer.

Preferably, in step S1, the reaction conditions of the dehydration under negative pressure are: a reaction temperature of 50-70° C., and a dehydration time of 0.5-2 hours.

Preferably, in step S2, the reaction time for polymerization is 3-8 hours.

Preferably, the prepolymer obtained in step S2 also needs to be chemically calibrated to determine its subsequent curing reaction group content. The reaction group is determined to determine the subsequent processing and molding conditions of the elastomer material, and to ensure that the subsequent molding reaction is thoroughly performed with a controllable crosslinking reaction. Without chemical calibration, the extent and reaction conditions of subsequent crosslinking reactions cannot be accurately controlled, resulting in the performance of the final product cannot be optimally reflected.

In a third aspect, the present invention provides an application of the prepolymer of elastomer material for screw drilling tools in the preparation of a stator of screw drilling tool.

Compared with the prior art, the present invention has the following beneficial effects.

1. The prepolymer of elastomer material for screw drilling tools prepared by the present invention can be obtained through corresponding structural design and copolymerization reaction, and can be directly used for drilling operations after a one-shot molding process. The method is simple and the overall drilling cost can be saved.

2. Through the structural design, different molecular segments of different proportions are introduced, such that the molecular structure of such prepolymers has both rigid and flexible segments, thus to achieve an adjustable and controllable structure of the prepolymer; and the introduction of active groups makes the prepolymer to show good reactivity and processability.

3. By adjusting the structure type and proportion of the reaction monomer, a prepolymer of elastomer material with adjustable and controllable performance can be obtained, which is suitable for various operating environments.

4. The material has significant improvements in temperature resistance, hardness, tear strength and interfacial peel strength compared with traditional rubber materials, such that the material can better adapt to today's severe drilling environment.

5. Compared with traditional materials, this material has a longer service life, simplified processing technology and is easy to realize industrialization.

DETAILED DESCRIPTION

The present disclosure is described in detail below with reference to specific embodiments. The following embodiments are described herein for facilitating those skilled in the art to further understand the present disclosure, but do not intend to limit the present disclosure in any form. It should be noted that for those of ordinary skill in the art, several changes and improvements may be made without departing from the concept of the present disclosure. The changes and improvement all belong to the protection scope of the present disclosure.

Embodiment 1

This embodiment provides a preparation method of a prepolymer of elastomer material for screw drilling tools, including the following steps:

Step (1), placing 20 kg of toluene diisocyanate (TDI) in a reaction kettle, raising the temperature to 50° C., and then performing dehydration under negative pressure for 1 hour;

Step (2), weighing out hydroxyl-terminated liquid nitrile rubber (10 kg), polytetrahydrofuran diol (6 kg), and polyethylene glycol (4 kg) with a molecular weight of 2000, and gradually dropping them in order into the reaction kettle in step (1) for continuously reacting at 50° C. for 8 hours;

Step (3), after the reaction in step (2) is completed, naturally cooling the reaction kettle to room temperature to obtain the virgin pulp of the prepolymer of elastomer material for screw drilling tools according to the present invention;

Step (4), chemically calibrating the virgin pulp of the prepolymer of elastomer material obtained in step (3) to determine its subsequent curing reaction group content.

The virgin pulp of the prepolymer of elastomer material obtained in step (4) of this embodiment is light yellow in color and has good fluidity and shows good performance after processing and molding. The method of processing and molding is: elastomer materials with good performance are obtained by hierarchical heating (the temperature for heating is 60° C., 80° C., 100° C., and 120° C., and the time for heating is 2 hours at each temperature). The same processing and molding methods are used in the following embodiments 2-5.

The test results are as follows: the tensile strength is 18.2 MPa, the elongation at break is 638%, the permanent deformation rate (recovery after 300% stretching) is 5.7%, the tear strength is 76 kN/m, and the Shore hardness is 84A. All data are higher than those as required by the standard of material for screw drilling tools (HG/T 4382-2012), which can well meet the drilling operation.

Embodiment 2

This embodiment provides a preparation method of a prepolymer of elastomer material for screw drilling tools, including the following steps:

Step (1), placing 20 kg of isophorone diisocyanate (IPDI) in a reaction kettle, raising the temperature to 50° C., and then performing dehydration under negative pressure for 1 hour;

Step (2), weighing out hydroxyl-terminated liquid nitrile rubber (10 kg), polytetrahydrofuran diol (6 kg), and trimethylolpropane polyether (4 kg) with a molecular weight of 4000, and gradually dropping them in order into the reaction kettle in step (1) for continuously reacting at 50° C. for 8 hours;

Step (3), after the reaction in step (2) is completed, naturally cooling the reaction kettle to room temperature to obtain the virgin pulp of the prepolymer of elastomer material for screw drilling tools according to the present invention;

Step (4) Chemically calibrating the virgin pulp of the prepolymer of elastomer material obtained in step (3) to determine its subsequent curing reaction group content.

The virgin pulp of the prepolymer of elastomer material obtained in step (4) of this embodiment is light yellow in color and has good fluidity and shows good performance after processing and molding. The test results are as follows: the tensile strength is 17.8 MPa, the elongation at break is 856%, the permanent deformation rate (recovery after 300% stretching) is 4.9%, the tear strength is 82 kN/m, and the Shore hardness is 78A. All data are higher than those as required by the standard of material for screw drilling tools (HG/T 4382-2012), which can well meet the drilling operation.

Embodiment 3

This embodiment provides a preparation method of a prepolymer of elastomer material for screw drilling tools, including the following steps:

Step (1), placing 20 kg of isophorone diisocyanate (IPDI) in a reaction kettle, raising the temperature to 50° C., and then performing dehydration under negative pressure for 1 hour;

Step (2), weighing out hydroxyl-terminated liquid nitrile rubber (6 kg), polytetrahydrofuran diol (10 kg), and propylene glycol polyether (4 kg) with a molecular weight of 2000, and gradually dropping them in order into the reaction kettle in step (1) for continuously reacting at 60° C. for 8 hours;

Step (3), after the reaction in step (2) is completed, naturally cooling the reaction kettle to room temperature to obtain the virgin pulp of the prepolymer of elastomer material for screw drilling tools according to the present invention;

Step (4), chemically calibrating the virgin pulp of the prepolymer of elastomer material obtained in step (3) to determine its subsequent curing reaction group content.

The virgin pulp of the prepolymer of elastomer material obtained in step (4) of this embodiment is light yellow in color and has good fluidity and shows good performance after processing and molding. The test results are as follows: the tensile strength is 19.7 MPa, the elongation at break is 656%, the permanent deformation rate (recovery after 300% stretching) is 5.1%, the tear strength is 72 kN/m, and the Shore hardness is 80A. All data are higher than those as required by the standard of material for screw drilling tools (HG/T 4382-2012), which can well meet the drilling operation.

Embodiment 4

This embodiment provides a preparation method of a prepolymer of elastomer material for screw drilling tools, including the following steps:

Step (1), placing 20 kg of toluene diisocyanate (TDI) in a reaction kettle, raising the temperature to 50° C., and then performing dehydration under negative pressure for 1 hour;

Step (2), weighing out hydroxyl-terminated liquid nitrile rubber (5 kg), polytetrahydrofuran diol (8 kg), and trimethylolpropane polyether (7 kg) with a molecular weight of 1000, and gradually dropping them in order into the reaction kettle in step (1) for continuously reacting at 60° C. for 5 hours;

Step (3), after the reaction in step (2) is completed, naturally cooling the reaction kettle to room temperature to obtain the virgin pulp of the prepolymer of elastomer material for screw drilling tools according to the present invention;

Step (4) Chemically calibrating the virgin pulp of the prepolymer of elastomer material obtained in step (3) to determine its subsequent curing reaction group content.

The virgin pulp of the prepolymer of elastomer material obtained in step (4) of this embodiment is light yellow in color and has good fluidity and shows good performance after processing and molding. The test results are as follows: the tensile strength is 20.9 MPa, the elongation at break is 712%, the permanent deformation rate (recovery after 300% stretching) is 5.8%, the tear strength is 88 kN/m, and the Shore hardness is 88A. All data are higher than those as required by the standard of material for screw drilling tools (HG/T 4382-2012), which can well meet the drilling operation.

Embodiment 5

This embodiment provides a preparation method of a prepolymer of elastomer material for screw drilling tools, including the following steps:

Step (1), placing 18 kg of isophorone diisocyanate in a reaction kettle, raising the temperature to 50-70° C., and then performing dehydration under negative pressure for 0.5-2 hours;

Step (2), weighing out hydroxyl-terminated liquid nitrile rubber (6 kg), polytetrahydrofuran diol (10 kg), and propylene glycol polyether (4 kg) with a molecular weight of 2000, and gradually dropping them in order into the reaction kettle in step (1) for continuously reacting at 60° C. for 5 hours;

Step (3), after the reaction in step (2) is completed, naturally cooling the reaction kettle to room temperature to obtain the virgin pulp of the prepolymer of elastomer material for screw drilling tools according to the present invention;

Step (4), chemically calibrating the virgin pulp of the prepolymer of elastomer material obtained in step (3) to determine its subsequent curing reaction group content.

The virgin pulp of the prepolymer of elastomer material obtained in step (4) of this embodiment is light yellow in color and has good fluidity and shows good performance after processing and molding. The test results are as follows: the tensile strength is 17.1 MPa, the elongation at break is 524%, the permanent deformation rate (recovery after 300% stretching) is 4.2%, the tear strength is 68 kN/m, and the Shore hardness is 89A. All data are higher than those as required by the standard of material for screw drilling tools (HG/T 4382-2012), which can meet the drilling operation.

Embodiment 6

This embodiment provides a preparation method of a prepolymer of elastomer material for screw drilling tools, including the following steps:

Step (1), placing 7.5 kg of bisphenol M cyanate in a reaction kettle, raising the temperature to 50-70° C., and then performing dehydration under negative pressure for 0.5-2 hours;

Step (2), weighing out hydroxyl-terminated liquid nitrile rubber (2 kg), polytetrahydrofuran diol (2 kg), and propylene glycol polyether (2 kg) with a molecular weight of 2000, and gradually dropping them in order into the reaction kettle in step (1) for continuously reacting at 60° C. for 5 hours;

Step (3), after the reaction in step (2) is completed, naturally cooling the reaction kettle to room temperature to obtain the virgin pulp of the prepolymer of elastomer material for screw drilling tools according to the present invention;

Step (4), chemically calibrating the virgin pulp of the prepolymer of elastomer material obtained in step (3) to determine its subsequent curing reaction group content.

The virgin pulp of the prepolymer of elastomer material obtained in step (4) of this embodiment is light yellow in color and has good fluidity and shows good performance after processing and molding. The test results are as follows: the tensile strength is 17.2 MPa, the elongation at break is 430%, the permanent deformation rate (recovery after 300% stretching) is 3.6%, the tear strength is 52 kN/m, and the Shore hardness is 90A. All data are higher than those as required by the standard of material for screw drilling tools (HG/T 4382-2012), which can meet the drilling operation.

Comparative Example 1

This comparative example provides a preparation method of a prepolymer of elastomer material for screw drilling tools. The specific steps are basically the same as those in Embodiment 1, except that: in step (2) of this example, weighing out hydroxyl-terminated liquid nitrile rubber (11 kg), polytetrahydrofuran diol (5 kg), and propylene glycol (4 kg) with a molecular weight of 2000.

The virgin pulp of the polyurethane prepolymer obtained in this example is dark yellow in color and has good fluidity and shows good performance after processing and molding. The test results are as follows: the tensile strength is 15.1 MPa, the elongation at break is 398%, the permanent deformation rate (recovery after 300% stretching) is 4.0%, the tear strength is 59 kN/m, and the Shore hardness is 62A. The tensile strength and hardness are lower than the standard index, and the tear strength and elongation at break are higher than the standard index but not considered excellent.

Comparative Example 2

This comparative example provides a preparation method of a prepolymer of elastomer material for screw drilling tools. The specific steps are basically the same as those in Embodiment 1, except that: in step (2) of this example, further including a dropwise addition of N'-m-phenylene dimaleimide (15 kg).

The virgin pulp of the polyurethane prepolymer obtained in this example is dark yellow in color and has good fluidity and shows good performance after processing and molding. The test results are as follows: the tensile strength is 13.2 MPa, the elongation at break is 523%, the permanent deformation rate (recovery after 300% stretching) is 6.1%, the tear strength is 62 kN/m, and the Shore hardness is 67A. The tensile strength and hardness are lower than the standard index, and the tear strength and elongation at break are higher than the standard index.

Comparative Example 3

This comparative example provides a preparation method of a prepolymer of elastomer material for screw drilling tools. The specific steps are basically the same as those in Embodiment 1, except that: in step (2) of this example, using glycerol (4 kg) instead of propylene glycol polyether.

The virgin pulp of the polyurethane prepolymer obtained in this example is dark yellow in color and has good fluidity and shows good performance after processing and molding. The test results are as follows: the tensile strength is 10.6 MPa, the elongation at break is 310%, the permanent deformation rate (recovery after 300% stretching) is 5.8%, the tear strength is 38 kN/m, and the Shore hardness is 56A. The tensile strength, tear strength and hardness are lower than the standard index, and the elongation at break is slightly higher than the standard index.

The specific embodiments of the present disclosure have been described above. It should be understood that the present disclosure is not limited to the above specific embodiments, and those skilled in the art can make various changes or modifications within the scope of the claims, which does not affect the essence of the present invention. In the case of no conflict, the embodiments of the present application and the features in the embodiments can be arbitrarily combined with each other.

The invention claimed is:

1. A prepolymer of elastomeric material for screw drilling tools, including component A and component B, wherein the component A includes hydroxyl-terminated liquid rubber, polytetrahydrofuran diol, and polyether polyol; the component B includes at least one of an isocyanate, a cyanate, or a cyano compound;

wherein a mass ratio of the hydroxyl-terminated liquid rubber, polytetrahydrofuran diol, and polyether polyol is (0.2-1.0): (0.2-1.0): (0.2-1.0); and wherein a mass ratio of the component A and the component B is (0.9:1.1) to (0.85:1.25).

2. The prepolymer of elastomeric material for screw drilling tools according to claim 1, wherein the hydroxyl-terminated liquid rubber includes hydroxyl-terminated liquid nitrile rubber.

3. The prepolymer of elastomeric material for screw drilling tools according to claim 1, wherein the component B is an isocyanate, and the isocyanate includes at least one of toluene diisocyanate or isophorone diisocyanate.

4. The prepolymer of elastomeric material for screw drilling tools according to claim 1, wherein the polyether polyol includes at least one of propylene glycol polyether with a weight average molecular weight of 800 to 2000, trimethylolpropane polyether with a weight average molecular weight of 400 to 4000, or polyethylene glycol with a weight average molecular weight of 400 to 2000.

5. The prepolymer of elastomeric material for screw drilling tools according to claim 1, wherein the mass ratio of the component A and the component B is 1:1.

6. A preparation method of a prepolymer of elastomeric material for screw drilling tools according to claim 1, including the following steps:
S1: placing component B in a reaction vessel, raising the temperature, and performing a dehydration under negative pressure;
S2: adding component A to the component B having been processed in step S1, performing polymerization reaction at a temperature of 50-95° C.; and cooling them to room temperature to obtain the prepolymer.

7. The preparation method of a prepolymer of elastomeric material for screw drilling tools according to claim 6, wherein in step S1, the reaction conditions of the dehydration under negative pressure include a reaction temperature of 50-70° C., and a dehydration time of 0.5-2 hours.

8. The preparation method of a prepolymer of elastomeric material for screw drilling tools according to claim 6, wherein in step S2, a reaction time for polymerization 15 3-8 hours.

9. An application of a prepolymer of elastomeric material for screw drilling tools in a preparation of a stator of screw drilling tool, wherein the prepolymer of elastomeric material for screw drilling tools includes component A and component B, wherein the component A includes hydroxyl-terminated liquid rubber, polytetrahydrofuran diol, and polyether polyol; the component B includes at least one of an isocyanate, a cyanate, or a cyano compound;

wherein a mass ratio of the hydroxyl-terminated liquid rubber, polytetrahydrofuran diol, and polyether polyol is (0.2-1.0): (0.2-1.0): (0.2-1.0).

10. The application of the prepolymer of elastomeric material for screw drilling tools according to claim 9, wherein the hydroxyl-terminated liquid rubber includes hydroxyl-terminated liquid nitrile rubber.

11. The application of the prepolymer of elastomeric material for screw drilling tools according to claim 9, wherein the component B is an isocyanate, and the isocyanate includes at least one of toluene diisocyanate or isophorone diisocyanate.

12. The application of the prepolymer of elastomeric material for screw drilling tools according to claim 9, wherein the polyether polyol includes at least one of propylene glycol polyether with a weight average molecular weight of 800 to 2000, trimethylolpropane polyether with a weight average molecular weight of 400 to 4000, or polyethylene glycol with a weight average molecular weight of 400 to 2000.

13. The application of the prepolymer of elastomeric material for screw drilling tools according to claim 9, wherein a mass ratio of the component A and the component B is (0.9:1.1) to (0.85:1.25).

14. The application of the prepolymer of elastomeric material for screw drilling tools according to claim 13, wherein the mass ratio of the component A and the component B is 1:1.

* * * * *